US009762403B2

(12) United States Patent
Keesara et al.

(10) Patent No.: US 9,762,403 B2
(45) Date of Patent: Sep. 12, 2017

(54) SHORTEST PATH BRIDGING (SPB)—PROTOCOL-INDEPENDENT MULTICAST (PIM) INTERACTIONS ON A BACKBONE EDGE BRIDGE (BEB) ACTING AS A MULTICAST BOUNDARY ROUTER INTERFACING WITH A PIM NETWORK

(71) Applicant: Avaya Inc., Basking Ridge, NJ (US)

(72) Inventors: Srikanth Keesara, Tewksbury, MA (US); Gautam Khera, Walpole, MA (US); Rama Suryanarayana Appalla, Nashua, NH (US)

(*) Notice: Subject to any disclaimer, the term of this patent is extended or adjusted under 35 U.S.C. 154(b) by 253 days.

(21) Appl. No.: 14/549,930

(22) Filed: Nov. 21, 2014

(65) Prior Publication Data
US 2016/0149714 A1 May 26, 2016

(51) Int. Cl.
*H04L 12/18* (2006.01)
*H04L 12/721* (2013.01)
*H04L 12/761* (2013.01)

(52) U.S. Cl.
CPC .............. *H04L 12/18* (2013.01); *H04L 45/12* (2013.01); *H04L 45/16* (2013.01)

(58) Field of Classification Search
CPC ................................. H04L 12/18; H04L 45/12
See application file for complete search history.

(56) References Cited

U.S. PATENT DOCUMENTS

| 7,519,010 | B1* | 4/2009 | Aggarwal | H04L 12/18 370/254 |
| 8,804,722 | B2* | 8/2014 | Appalla | H04L 12/1836 370/390 |
| 9,325,636 | B2* | 4/2016 | Yang | H04L 12/18 |
| 2009/0265743 | A1* | 10/2009 | Gao | H04N 7/17327 725/94 |
| 2013/0077627 | A1* | 3/2013 | Appalla | H04L 12/1836 370/390 |
| 2013/0077628 | A1* | 3/2013 | Appalla | H04L 45/16 370/390 |
| 2013/0208624 | A1* | 8/2013 | Ashwood-Smith | H04L 45/50 370/255 |
| 2015/0146603 | A1* | 5/2015 | Wu | H04L 12/189 370/312 |

* cited by examiner

*Primary Examiner* — Xavier S Wong
(74) *Attorney, Agent, or Firm* — Ropes & Gray LLP (57) ABSTRACT

A method apparatus and computer readable medium for preforming SPB-PIM multicast interactions is presented. A Backbone Edge Bridge (BEB) in a Shortest Path Bridging (SPB) network discovers a multicast stream originating within a Protocol-Independent Multicast (PIM) network. The BEB sends multicast information to a Rendezvous Point (RP) in the PIM network. The BEB advertises a multicast stream learned from the RP into the SPB network. The BEB receives an update that includes a receiver interest in said multicast stream and initiates PIM join procedures for permitting the receiver to receive the multicast stream.

20 Claims, 9 Drawing Sheets

SHORTEST PATH BRIDGING (SPB)—PROTOCOL-INDEPENDENT MULTICAST (PIM) INTERACTIONS ON A BACKBONE EDGE BRIDGE (BEB) ACTING AS A MULTICAST BOUNDARY ROUTER INTERFACING WITH A PIM NETWORK

BACKGROUND

The present disclosure relates to network computing. Computer networks typically include a collection of computing devices enabled to communicate with each other for handling data traffic and control instructions. For example, such devices can include servers, data centers, routers, network switches, management applications, wireless access points, and client computers. Computer networks can provide network connectivity to wired computing devices and/or wireless computing devices.

One type of network technology is known as Shortest Path Bridging (SPB). A set of standards for implementing Shortest Path Bridging is generally specified by the Institute of Electrical and Electronics Engineers (IEEE). Specifically, this standard is identified as IEEE 802.1aq. Network services, including SPB services are commonly provided using Ethernet technology. Ethernet has become a default Data Link Layer technology for data transport, that is, the default for Layer 2 (L2) of the Open Systems Interconnection (OSI) model. SPB can expand Ethernet technologies to other or larger networks. For example, a network that uses IEEE 802.1aq SPB can advertise both topology and logical network membership. SPB uses a link state protocol for such advertising.

In an SPB network, packets are encapsulated at an edge node in Mac-in-Mac 802.1ah and transported only to other members of the logical network. IEEE 802.1aq supports unicast and multicast, and all routing is on symmetric shortest paths. There exist other related technologies that follow the model of a provider network (transport network) that connects two or more customer networks (access networks), where the provider network is functionally distinct from the customer network, even if a single administrator runs both networks.

The SPB network typically includes a Backbone Edge Bridge (BEB) and a Backbone Core Bridge (BCB). BEBs (also known as provider network edge nodes) function as devices that enable transfer of packets to/from interfaces within the SPB network and to/from interfaces outside the SPB network.

A network protocol related to SPB is known as Intermediate System To Intermediate System (ISIS). IS-IS is a routing protocol that routes data by determining a best route for datagrams transmitted through a packet-switched network. The IS-IS protocol is published by Internet Engineering Task Force (IETF) as an Internet Standard in RFC 1142, as well as in International Organization for Standardization (ISO)/International Electrotechnical Commission (IEC) 10589:2002. SPB Networks can use IS-IS as a control protocol and type-length-value (TLV) structures for control messaging. A TLV structure allows optional information to be encoded within a given packet.

Multicasting is a point-to-multipoint model for delivery of information from one source to a group of destination computers. There are various protocols for implementing multicasting in Internet Protocol (IP) networks. For example, one technology is Protocol-Independent Multicast (PIM). PIM includes a few different protocols that can create different distribution trees for sending data packets to interested receivers (or groups of interested receivers) in a single transmission.

SUMMARY

As the deployment of SPB technology advances, there are often scenarios where the SPB Network has to interface with a traditional PIM network. This requires the ability to allow a receiver connected to the SPB Network to receive traffic from a Source that is connected to the PIM Network, to allow a receiver connected to the PIM Network to receive traffic from a Source that is connected to the SPB Network, and to provide protocol message sequences that allow multicast traffic to be routed between the PIM and SPB Networks.

Supporting such a solution requires an ability to trigger some PIM protocol messaging and state machines based on events in the SPB Network. It also requires triggering certain ISIS messaging and updates based on events in the PIM Network. The presently disclosed method and apparatus provides for critical interactions that allow for routing multicast traffic between a PIM Network and a SPB Network.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

In a particular embodiment of a method for providing SPB-PIM interactions on a BEB acting as a multicast boundary router interfacing with a PIM network, the method includes discovering, by a Backbone Edge Bridge (BEB) in a Shortest Path Bridging (SPB) network, a multicast stream originating within a Protocol-Independent Multicast (PIM) network. The method further includes sending, by the BEB, multicast information to a Rendezvous Point (RP) in the PIM network. Additionally the method includes advertising, by the BEB, a multicast stream learned from the RP into the SPB network. The method also includes receiving, by the BEB, an update that includes a receiver interest in the multicast stream and initiating, by the BEB, PIM join procedures for permitting the receiver to receive the multicast stream.

In another embodiment the method includes receiving, by a first Backbone Edge Bridge (BEB) in a Shortest Path Bridging (SPB) network ISIS TLVs for a multicast stream from a second BEB in the SPB Network. The method further includes receiving, by the first BEB, a join message from a device in a Protocol-Independent Multicast (PIM) network communicating with the first BEB in the SPB network. Additionally the method includes The first BEB sending ISIS TLVs requesting the second BEB to send the stream. Additionally the method includes providing a multicast route in the SPB network. Further, the method includes building SPB state within the SPB network and sending multicast traffic from the second BEB to the PIM network.

Other embodiments include a computer readable medium having computer readable code thereon for providing SPB-PIM interactions on a BEB acting as a multicast boundary router interfacing with a PIM network. The computer readable medium includes instructions for discovering, by a Backbone Edge Bridge (BEB) in a Shortest Path Bridging (SPB) network, a multicast stream originating within a Protocol-Independent Multicast (PIM) network. The computer readable medium further includes instructions for sending, by the BEB, multicast information to a Rendezvous Point (RP) in the PIM network. Additionally the computer readable medium includes instructions for advertising, by the BEB, a multicast stream learned from the RP into the SPB network. The computer readable medium also includes instructions for receiving, by the BEB, an update that includes a receiver interest in the multicast stream and instructions for initiating, by the BEB, PIM join procedures for permitting the receiver to receive the multicast stream.

In another embodiment of a computer readable medium having computer readable code thereon for providing SPB-PIM interactions on a BEB acting as a multicast boundary router interfacing with a PIM network, the computer readable medium includes instructions for receiving, by a first Backbone Edge Bridge (BEB) in a Shortest Path Bridging (SPB) network multicast stream data from a second BEB in the SPB network. The computer readable medium further includes instructions for receiving, by the first BEB, a join message from a device in a Protocol-Independent Multicast (PIM) network communicating with the first BEB in the SPB network. Additionally the computer readable medium includes instructions for providing a multicast route in the SPB network. Further, the computer readable medium includes instructions for building SPB state within the SPB network and instructions for sending multicast traffic from the second BEB to the PIM network.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides SPB-PIM interactions on a BEB acting as a multicast boundary router interfacing with a PIM network as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing SPB-PIM interactions on a BEB acting as a multicast boundary router interfacing with a PIM network as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. The drawings are not necessarily to scale, emphasis instead being placed upon illustrating the principles of the invention.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

Figure 1:
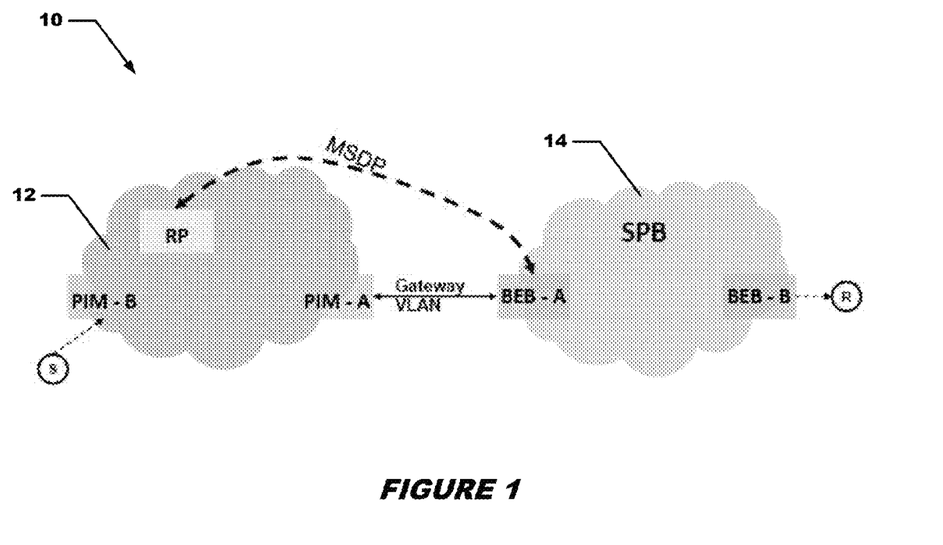
FIG. 1 depicts a diagram showing a PIM source for multicast traffic and an SPB receiver in accordance with a particular embodiment of the present invention.
Figure 2:
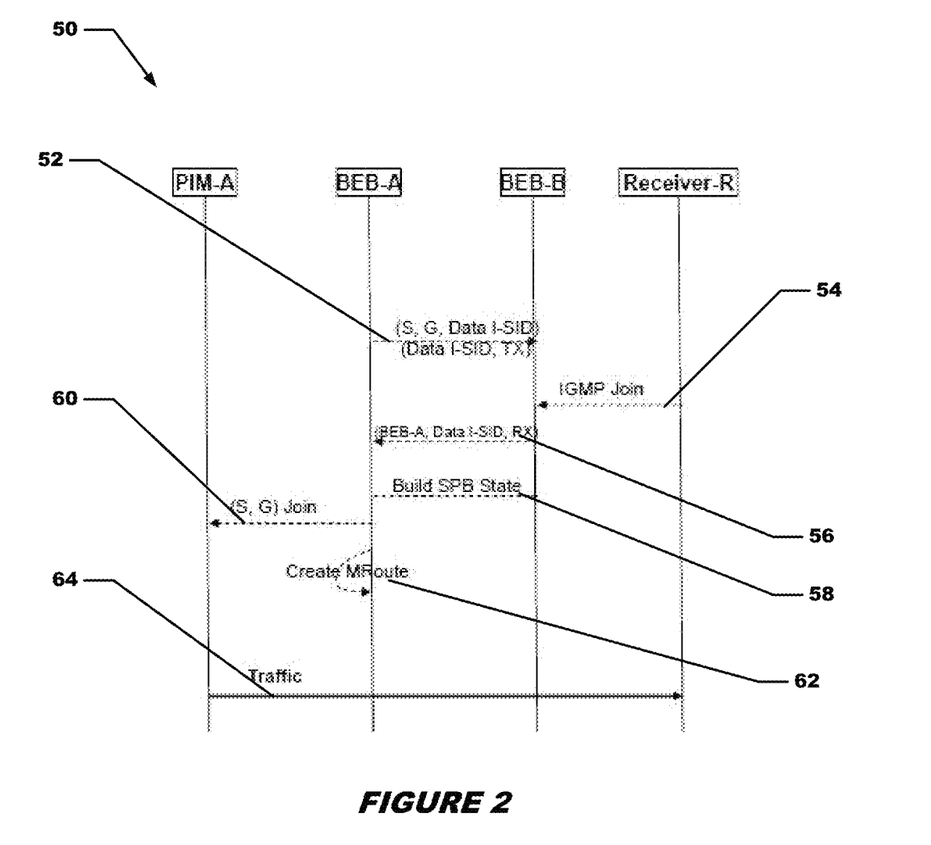
FIG. 2 depicts a signaling diagram showing a PIM source for multicast traffic and an SPB receiver joining a multicast traffic flow in accordance with a particular embodiment of the present invention.
Figure 3:
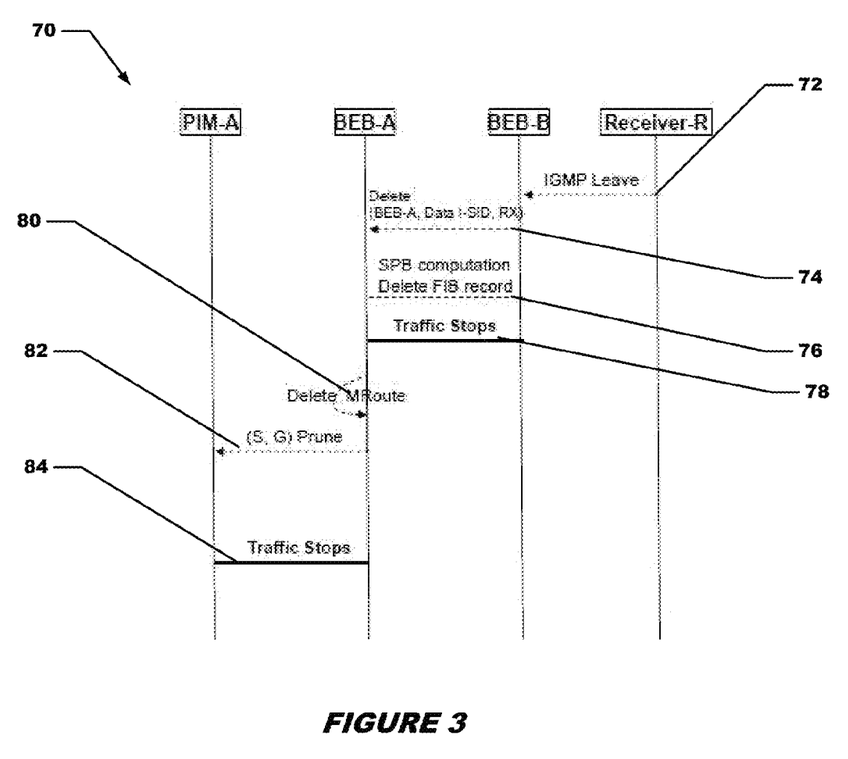
FIG. 3 signaling a flow diagram showing a PIM source for multicast traffic and an SPB receiver pruning a multicast traffic flow in accordance with a particular embodiment of the present invention.

Referring to FIGS. 1 through 3, a network block diagram and associated signaling diagram are shown wherein a Receiver (R) connected to an SPB network requests to receive multicast traffic from a Sender (S) connected to a PIM network. A PIM-SPB domain 10 includes a PIM-based network 12 in communication with an SPB based network 14. It is desirable to have a multicast stream originating from the source (S) connected to the PIM network 12, be received by the receiver (R) connected to the SPB network 14. This is accomplished by enhancing the boundary device BEB-A of the SPB network 14 such that the PIM network 12 acts as if it is communicating with another PIM network.

An SPB Backbone Edge Bridge (BEB-A) running a Multicast Source Discovery Protocol (MSDP) session with a Rendezvous Point (RP) in the PIM network 12 discovers the streams that exist in the PIM Network 12. In a conventional PIM network, a Rendezvous Point (RP) is a root of a shared tree. Accordingly, corresponding receivers send join messages to the RP. BEB-A takes multicast information from an ISIS Link State Data Base and sends it to the RP. BEB-A advertises the streams learned from the RP into the SPB Network using Intermediate System To Intermediate System (ISIS) Type Length Values (TLVs).

BEB-A receives an ISIS Link State data Base (LSDB) update that includes a Receiver (R) interest (via BEB-B) for an I-SID associated with a multicast stream originating in the PIM Network. BEB-A initiates PIM (S, G) join procedures for the stream. This includes sending a PIM (S, G) Join on the PIM interface (PIM-A) that connects it with a multicast router in the PIM Network. This also includes periodically refreshing the PIM (S, G) join for as long as there is receiver interest for this stream from the SPB Network.

Referring now to FIG. 2, the individual signaling messages 50 involved in this JOIN operation are shown. BEB-A sends ISIS TLVs 52 signaling the availability of the stream to BEB-B which is in communication with receiver R. Receiver R shows interest in the multicast stream by sending an IGMP join 54 to BEB-B. BEB-B sends a RCV TLV 56 to BEB-A. SPB state is built between BEB-B and BEB-A.

One of the novel aspects of the present invention now come into action. BEB-A sends a PIM Join message 60 to PIM-A. A multicast route 62 is produced and traffic flows from the multicast sender S via PIM-A to BEB-A, from BEB-A to BEB-B and from BEB-B to the receiver R. In such a manner multicast traffic can be sent from a PIM-based network to an SPB-based network with no changes to the PIM side of the network or devices.

A prune operation wherein the receiver R leaves the multicast stream happens as follows. BEB-A receives an ISIS LSDB update that results in the removal of receiver interest on an I-SID corresponding to a stream originating in the neighboring PIM Network. BEB-A determines that there are no more SPB receivers left for the stream. BEB-A sends an (S, G) Prune on the PIM interface connecting it to the multicast router in the neighboring PIM network where the stream originates.

FIG. 3 shows the individual signaling 70 involved in the above-described prune operation. The Receiver R sends an IGMP leave message 72 into the SPB network to BEB-B. BEB-B sends a message to BEB-A regarding deleting the multicast interest for the receiver R. A computation is made determining that there is no other receiver interest in the multicast stream 76 and the multicast traffic within the SPB network 14 stops. The multicast route is deleted 80. BEB-A sends a PIM prune message 82 into the PIM network 12. The multicast traffic associated with the receiver stops 84.

Figure 4:
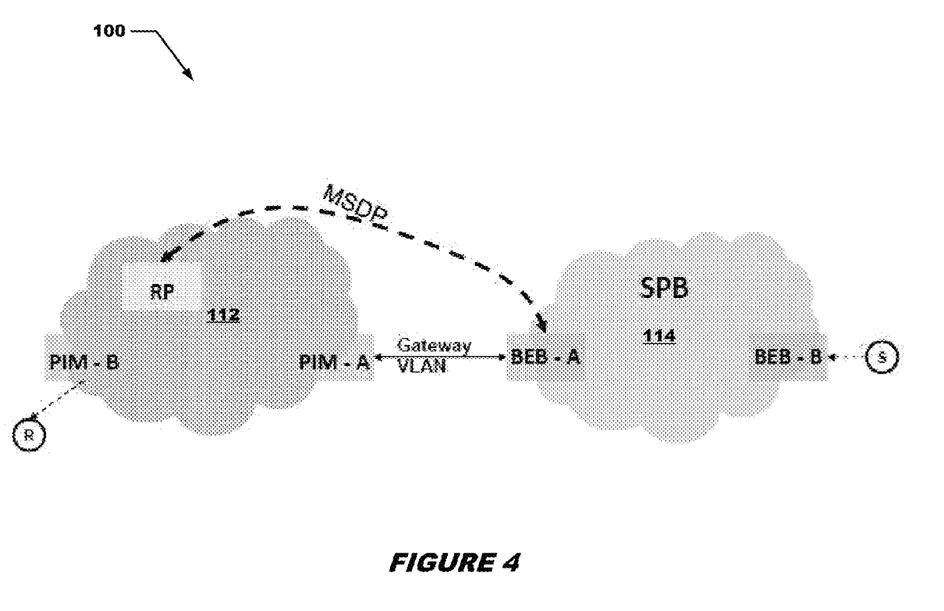
FIG. 4 depicts a diagram showing an SPB source for multicast traffic and a PIM receiver in accordance with a particular embodiment of the present invention.
Figure 5:
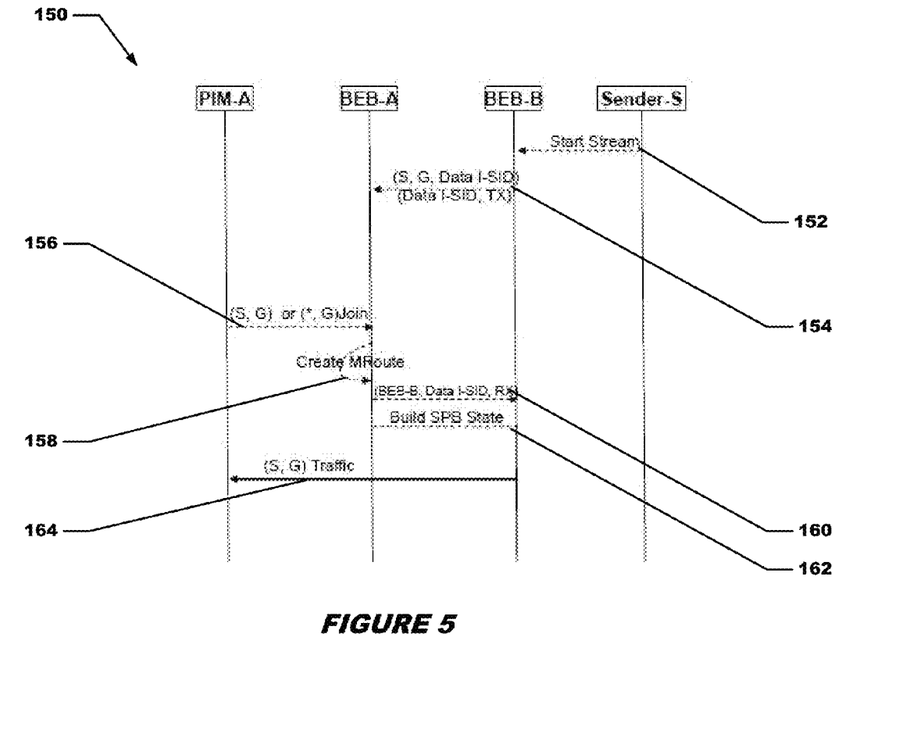
FIG. 5 depicts a signaling diagram showing an SPB source for multicast traffic and a PIM receiver joining a multicast traffic flow in accordance with a particular embodiment of the present invention.
Figure 6:
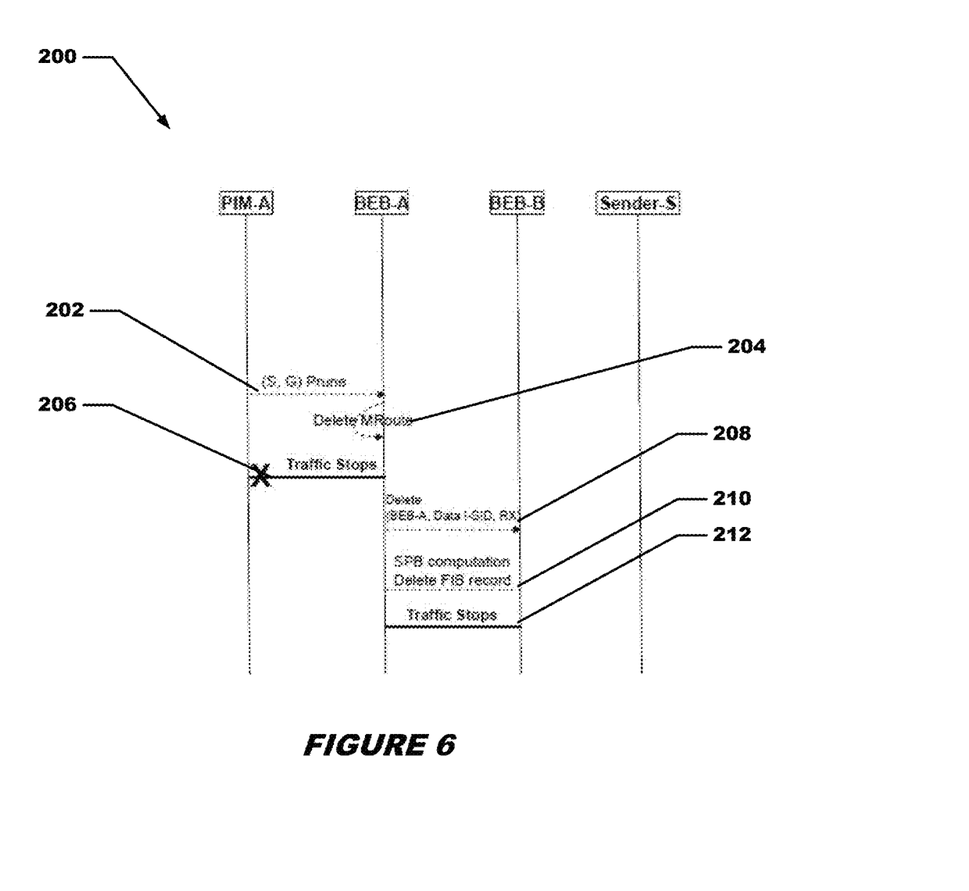
FIG. 6 depicts a signaling diagram showing an SPB source for multicast traffic and a PIM receiver pruning a multicast traffic flow in accordance with a particular embodiment of the present invention.

Referring to FIGS. 4 through 6, a network block diagram and associated signaling diagram are shown wherein a Receiver connected to a PIM network requests to receive multicast traffic from a Sender connected to an SPB network. A PIM-SPB domain 100 includes a PIM-based network 112 in communication with an SPB based network 114. It is desirable to have a multicast stream originating from a source (S) connected to the SPB network 114, be received by a receiver (R) connected to the PIM network 112. This is accomplished by enhancing the boundary device BEB-A of the SPB network 114 such that the PIM network 112 thinks it is communicating with another PIM network.

Referring now to FIG. 5 the individual signaling messages 150 involved in this JOIN operation are shown. Sender S starts sending a multicast stream 152 to BEB-B in the SPB network. BEB-B sends ISIS TLVs 154 signaling the availability of the stream data 154 to BEB-A. The novel aspects of the present invention now come into action. PIM-A sends a PIM Join message 156 to BEB-A. A multicast route 158 is produced, an RCV TLV 160 is sent from BEB-A to BEB-B. SPB state 162 is built and traffic flows from the multicast sender S via BEB-B-A to BEB-A, from BEB-A to PIM-A and from PIM-AB to the receiver R. In such a manner multicast traffic can be sent from an SPB-based network to a PIM-based network with no changes to the PIM side of the network or devices.

A prune operation 200 is shown in FIG. 6 wherein a receiver R leaves the multicast stream. A Prune message 202 is received from PIM-A at BEB-A. The multicast route is deleted 204, and multicast traffic between PIM-A and BEB-A stops. BEB-B receives a delete TLV 208 from BEB-A. BEB-A determines that there is no other multicast receiver interest and deletes the record 210. Multicast traffic from BEB-A to BEB-B stops 212.

Figure 7:
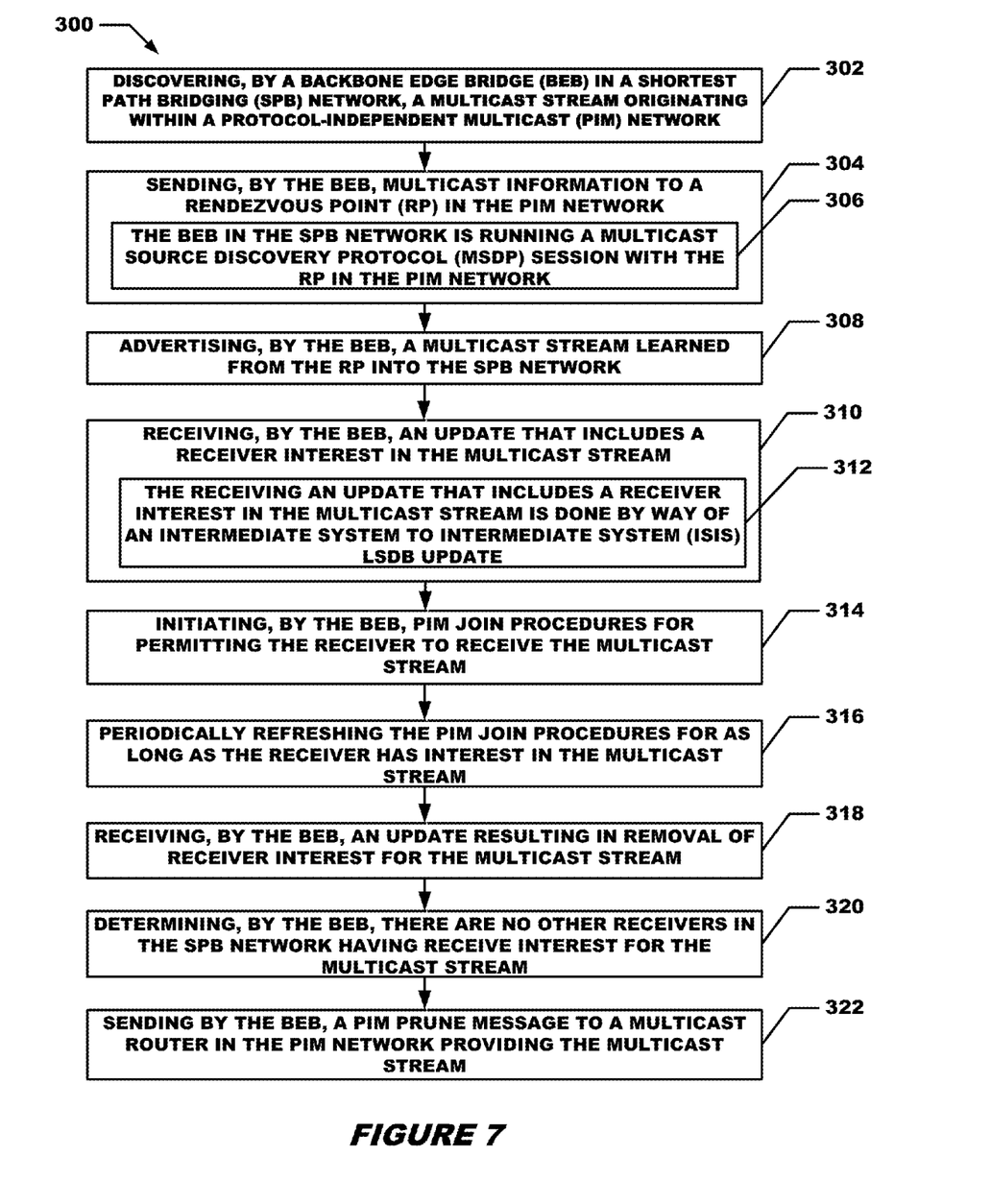
FIG. 7 depicts a flow diagram for a first particular embodiment of a method for providing SPB-PIM interactions on a BEB acting as a multicast boundary router interfacing with a PIM network in accordance with a particular embodiment of the present invention.
Figure 8:
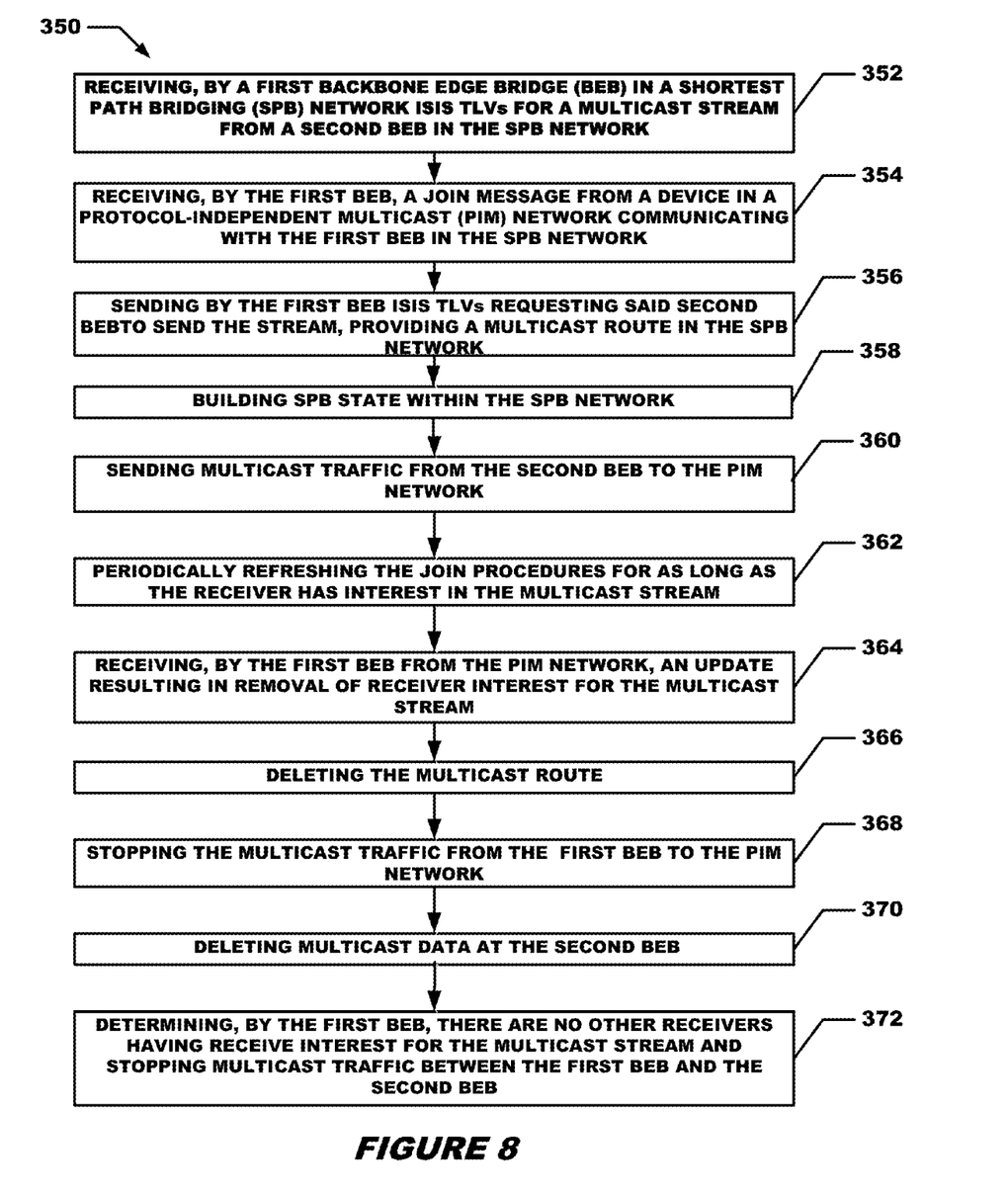
FIG. 8 depicts a flow diagram for a second particular embodiment of a method for providing SPB-PIM interactions on a BEB acting as a multicast boundary router interfacing with a PIM network in accordance with a particular embodiment of the present invention.

Flow diagrams of particular embodiments of the presently disclosed methods are depicted in FIGS. 7 and 8. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 7, a particular embodiment 300 of a method providing Shortest Path Bridging (SPB)-Protocol-Independent Multicast (PIM) protocol interactions is shown. In this method the multicast sender is connected to a PIM network and the multicast receiver is connected to an SPB network. The method begins with processing block 302 which discloses discovering, by a Backbone Edge Bridge (BEB) in a Shortest Path Bridging (SPB) network, a multicast stream originating within a Protocol-Independent Multicast (PIM) network.

Processing block 304 states sending, by the BEB, multicast information to a Rendezvous Point (RP) in the PIM network. As shown in processing block 306 the BEB in the SPB network is running a Multicast Source Discovery Protocol (MSDP) session with the RP in the PIM network.

Processing block 308 recites advertising, by the BEB, a multicast stream learned from the RP into the SPB network. In response, as shown in processing block 310, the BEB receives an update that includes a receiver interest in the multicast stream. As further shown in processing block 312 the receiving an update that includes a receiver interest in the multicast stream is done by way of an Intermediate System to Intermediate System (ISIS) LSDB update.

Processing block 314 discloses initiating, by the BEB, PIM join procedures for permitting the receiver to receive the multicast stream. Further, as shown in processing block 316, the PIM join procedures are periodically refreshed for as long as the receiver has interest in the multicast stream.

The method 300 also includes a prune procedure, as explained in the following description. Processing continues with processing block 318 which states receiving, by the BEB, an update resulting in removal of receiver interest for the multicast stream. Processing block 320 recites determining, by the BEB, there are no other receivers in the SPB network having receive interest for the multicast stream. Processing block 322 discloses sending by the BEB, a PIM Prune message to a multicast router in the PIM network providing the multicast stream.

Referring now to FIG. 8, a particular embodiment 350 of a method providing Shortest Path Bridging (SPB)-Protocol-Independent Multicast (PIM) protocol interactions is shown. In this method the multicast sender is connected to an SPB network and the multicast receiver is connected to a PIM network. The method begins with processing block 352 which discloses receiving, by a first Backbone Edge Bridge (BEB) in a Shortest Path Bridging (SPB) Network, ISIS TLVs signaling the availability of a multicast stream from a second BEB in the SPB Network.

Processing block 354 states receiving, by the first BEB, a join message from a device in a Protocol-Independent Multicast (PIM) network communicating with the first BEB in the SPB network. In response and as shown in processing block 356, providing a multicast route in the SPB network by The first BEB sending ISIS TLVs requesting the second BEB to send the stream. This further includes, as can be seen in processing block 358 building SPB state within the SPB network.

Processing block 360 recites sending multicast traffic from the second BEB to the PIM network. As further shown in processing block 362 the method further includes periodically refreshing the join procedures for as long as the receiver has interest in the multicast stream.

The method 350 also includes a prune procedure, as explained in the following description. Processing continues with processing block 364 which discloses receiving, by the first BEB from the PIM network, an update resulting in removal of receiver interest for the multicast stream. As shown in processing block 366, this results in deleting the multicast route. As further shown in processing block 368, the next step is stopping the multicast traffic from the first BEB to the PIM network.

Referring to processing block 370, the method includes deleting multicast data at the second BEB. As shown in processing block 372 the method further comprises determining, by the first BEB, there are no other receivers having network having receive interest for the multicast stream and stopping multicast traffic between the first BEB and the second BEB.

Figure 9:
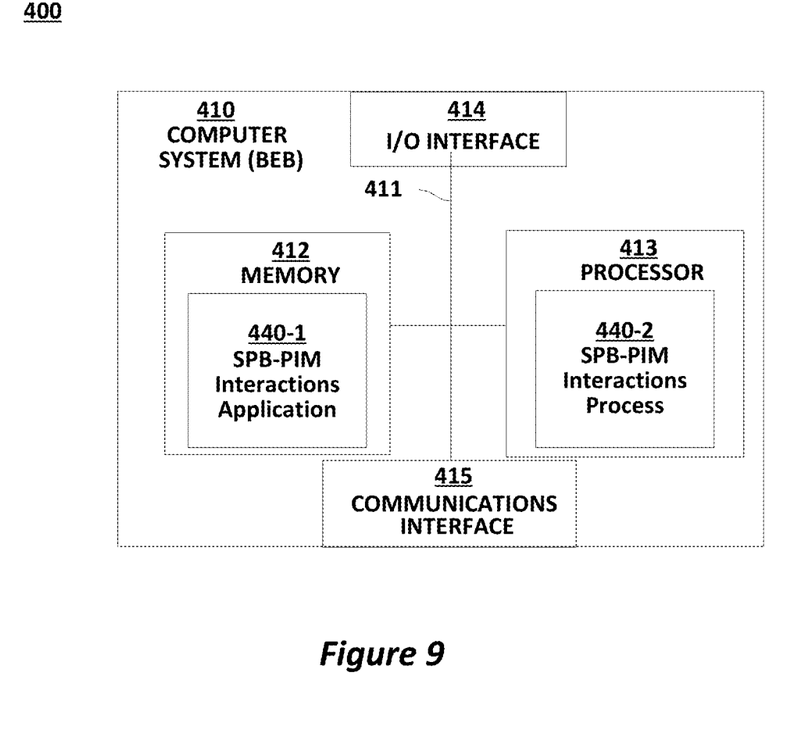
FIG. 9 depicts a block diagram of a BEB device in accordance with a particular embodiment of the present invention.

FIG. 9 is a block diagram illustrating example architecture of a computer system (e.g. a BEB) 410 that executes, runs, interprets, operates or otherwise performs a providing SPB-PIM interactions operating application 440-1 and providing SPB-PIM interactions operating process 440-2 suitable for use in explaining example configurations disclosed herein. The computer system 410 may be any type of computerized device such as a personal computer, workstation, portable computing device, console, laptop, network terminal or the like. An input device 416 (e.g., one or more customer/developer controlled devices such as a keyboard, mouse, etc.) couples to processor 413 through I/O interface 414, and enables a customer 408 to provide input commands, and generally control the graphical customer interface 460 that the providing SPB-PIM interactions operating application 440-1 and process 440-2 provides on the display 430. As shown in this example, the computer system 410 includes an interconnection mechanism 411 such as a data bus or other circuitry that couples a memory system 412, a processor 413, an input/output interface 414, and a communications interface 415. The communications interface 415 enables the computer system 410 to communicate with other devices (i.e., other computers) on a network (not shown).

The memory system 412 is any type of computer readable medium, and in this example, is encoded with a providing SPB-PIM interactions operating application 440-1 as explained herein. The providing SPB-PIM interactions operating application 440-1 may be embodied as software code such as data and/or logic instructions (e.g., code stored in the memory or on another computer readable medium such as a removable disk) that supports processing functionality according to different embodiments described herein. During operation of the computer system 410, the processor 413 accesses the memory system 412 via the interconnect 411 in order to launch, run, execute, interpret or otherwise perform the logic instructions of a providing SPB-PIM interactions operating application 440-1. Execution of a providing SPB-PIM interactions operating application 440-1 in this manner produces processing functionality in the providing SPB-PIM interactions operating process 440-2. In other words, the providing SPB-PIM interactions operating process 440-2 represents one or more portions or runtime instances of a providing SPB-PIM interactions operating application 440-1 (or the entire a providing SPB-PIM interactions operating application 440-1) performing or executing within or upon the processor 413 in the computerized device 410 at runtime.

It is noted that example configurations disclosed herein include the providing SPB-PIM interactions operating application 440-1 itself (i.e., in the form of un-executed or non-performing logic instructions and/or data). The providing SPB-PIM interactions operating application 440-1 may be stored on a computer readable medium (such as a floppy disk), hard disk, electronic, magnetic, optical, or other computer readable medium. A providing SPB-PIM interactions operating application 440-1 may also be stored in a memory system 412 such as in firmware, read only memory (ROM), or, as in this example, as executable code in, for example, Random Access Memory (RAM). In addition to these embodiments, it should also be noted that other embodiments herein include the execution of a providing SPB-PIM interactions operating application 440-1 in the processor 413 as the providing SPB-PIM interactions operating process 440-2. Those skilled in the art will understand that the computer system 410 may include other processes and/or software and hardware components, such as an operating system not shown in this example.

During operation, processor 413 of computer system 400 accesses memory system 412 via the interconnect 411 in order to launch, run, execute, interpret or otherwise perform the logic instructions of the providing SPB-PIM interactions application 440-1. Execution of providing SPB-PIM interactions application 440-1 produces processing functionality in providing SPB-PIM interactions process 440-2. In other words, the providing SPB-PIM interactions process 440-2 represents one or more portions of the providing SPB-PIM interactions application 440-1 (or the entire application) performing within or upon the processor 413 in the computer system 400.

It should be noted that, in addition to the providing SPB-PIM interactions process 440-2, embodiments herein include the providing SPB-PIM interactions application 440-1 itself (i.e., the un-executed or non-performing logic instructions and/or data). The providing SPB-PIM interactions application 440-1 can be stored on a computer readable medium such as a floppy disk, hard disk, or optical medium. The providing SPB-PIM interactions application 440-1 can also be stored in a memory type system such as in firmware, read only memory (ROM), or, as in this example, as executable code within the memory system 412 (e.g., within Random Access Memory or RAM).

In addition to these embodiments, it should also be noted that other embodiments herein include the execution of providing SPB-PIM interactions application 440-1 in processor 413 as the providing SPB-PIM interactions process 440-2. Those skilled in the art will understand that the computer system 400 can include other processes and/or software and hardware components, such as an operating system that controls allocation and use of hardware resources associated with the computer system 400.

The device(s) or computer systems that integrate with the processor(s) may include any devices capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims.

What is claimed is:

1. A computer-implemented method in which a computer system performs operations comprising:
   discovering, by a Backbone Edge Bridge (BEB) in a Shortest Path Bridging (SPB) network, a multicast stream originating from a multicast router within a Protocol-Independent Multicast (PIM) network;
   sending, by the BEB, multicast information to a Rendezvous Point (RP) in the PIM network;
   advertising, by the BEB, the multicast stream learned from the RP into the SPB network;
   receiving, by the BEB, an update that comprises an indication of a receiver interest in the multicast stream for an SPB receiver associated with the SPB network;
   initiating, by the BEB, PIM join procedures for permitting the SPB receiver to receive the multicast stream by sending a PIM join message to a PIM interface;
   providing, by the BEB, a multicast route in the SPB network; and
   sending, by the BEB, to the SPB receiver via the multicast route, the multicast stream from the multicast router.

2. The method of claim 1, further comprising:
   periodically refreshing, by the BEB, the PIM join procedures for as long as the SPB receiver has interest in the multicast stream.

3. The method of claim 1, further comprising:
   receiving, by the BEB, a second update resulting in removal of the receiver interest by the SPB receiver for the multicast stream;
   determining, by the BEB, that there are no other SPB receivers associated with the SPB network having receiver interest for the multicast stream; and
   sending by the BEB, via the PIM interface, a PIM Prune message to the multicast router in the PIM network providing the multicast stream.

4. The method of claim 1, wherein discovering the multicast stream comprises the BEB in the SPB network running a Multicast Source Discovery Protocol (MSDP) session with the RP in the PIM network.

5. The method of claim 1, wherein receiving the update that comprises the receiver interest in the multicast stream is performed by way of an Intermediate System to Intermediate System (ISIS) Link State Data Base (LSDB) update.

6. A non-transitory computer readable storage medium having computer readable code thereon for providing Shortest Path Bridging (SPB)-Protocol-Independent Multicast (PIM) protocol interactions, the medium including instructions in which a Backbone Edge Bridge (BEB) of an SPB network performs operations comprising:
   discovering a multicast stream originating from a multicast router within a PIM network;
   sending multicast information to a Rendezvous Point (RP) in the PIM network;
   advertising the multicast stream learned from the RP into the SPB network;
   receiving an update that comprises an indication of a receiver interest in the multicast stream for an SPB receiver associated with the SPB network;
   initiating PIM join procedures for permitting the SPB receiver to receive the multicast stream by sending a PIM join message to a PIM interface;
   providing a multicast route in the SPB network; and
   sending, to the SPB receiver via the multicast route, the multicast stream from the multicast router.

7. The non-transitory computer readable storage medium of claim 6, further comprising instructions in which the BEB performs operations comprising:
   periodically refreshing the PIM join procedures for as long as the SPB receiver has interest in the multicast stream.

8. The non-transitory computer readable storage medium of claim 6, further comprising instructions in which the BEB performs operations comprising:
   receiving a second update resulting in removal of the receiver interest by the SBP receiver for the multicast stream;
   determining that there are no other SPB receivers associated with the SPB network having receiver interest for the multicast stream; and
   sending, via the PIM interface, a PIM Prune message to the multicast router in the PIM network providing the multicast stream.

9. The non-transitory computer readable storage medium of claim 6, wherein discovering the multicast stream comprises the BEB in the SPB network running a Multicast Source Discovery Protocol (MSDP) session with the RP in the PIM network.

10. The non-transitory computer readable storage medium of claim 6, wherein receiving the update that includes the receiver interest in the multicast stream is performed by way of an Intermediate System to Intermediate System (ISIS) Link State Data Base (LSDB) update.

11. A computer-implemented method in which a computer system performs operations comprising:
   receiving, by a first Backbone Edge Bridge (BEB) in a Shortest Path Bridging (SPB) network, from a second BEB in the SPB network, Intermediate System to Intermediate System (ISIS) Type Length Values (TLVs) indicating availability of a multicast stream originating from an SPB source connected to the second BEB and associated with the SPB Network;
   receiving, by the first BEB, from a Protocol-Independent Multicast (PIM) interface communicating with the first BEB in the SPB network, a join message from a PIM receiver associated with a PIM network;

initiating, by the first BEB, join procedures by sending ISIS TLVs requesting the second BEB to send the multicast stream;
providing, by the first BEB, a multicast route in the SPB network;
building, by the first BEB, SPB state within the SPB network; and
sending, by the first BEB via the multicast route, the multicast stream from the SPB source to the PIM receiver.

12. The method of claim 11, further comprising:
periodically refreshing, by the first BEB, the join procedures for as long as the PIM receiver has interest in the multicast stream.

13. The method of claim 11, further comprising:
receiving, by the first BEB from the PIM interface, an update resulting in removal of receiver interest by the PIM receiver for the multicast stream;
deleting, by the first BEB, the multicast route; and
stopping, by the first BEB, the multicast stream from the first BEB to the PIM receiver.

14. The method of claim 13, further comprising:
determining, by the first BEB, that there are no other PIM receivers having receiver interest for the multicast stream; and
stopping, by the first BEB, the multicast stream between the first BEB and the second BEB.

15. The method of claim 11, further comprising:
deleting multicast data at the second BEB.

16. A non-transitory computer readable storage medium having computer readable code thereon for providing Shortest Path Bridging (SPB)-Protocol-Independent Multicast (PIM) protocol interactions, the medium including instructions in which Backbone Edge Bridges (BEBs) of an SPB network perform operations comprising:
receiving, by a first BEB in the SPB network, from a second BEB in the SPB network, Intermediate System to Intermediate System (ISIS) Type Length Values (TLVs) indicating availability of a multicast stream originating from an SPB source connected to the second BEB and associated with the SPB Network;
receiving, by the first BEB, from a PIM interface communicating with the first BEB in the SPB network, a join message from a PIM receiver associated with a PIM network;
initiating, by the first BEB, join procedures by sending ISIS TLVs requesting the second BEB to send the multicast stream;
providing, by the first BEB, a multicast route in the SPB network;
building, by the first BEB, SPB state within the SPB network; and
sending, by the first BEB via the multicast route, the multicast stream from the SPB source to the PIM receiver.

17. The non-transitory computer readable storage medium of claim 16, further comprising instructions in which the BEBs perform operations comprising:
periodically refreshing, by the first BEB, the join procedures for as long as the PIM receiver has interest in the multicast stream.

18. The non-transitory computer readable storage medium of claim 16, further comprising instructions in which the BEBs perform operations comprising:
receiving, by the first BEB from the PIM network, an update resulting in removal of receiver interest by the PIM receiver for the multicast stream;
deleting, by the first BEB, the multicast route; and
stopping, by the first BEB, the multicast stream from the first BEB to the PIM receiver.

19. The non-transitory computer readable storage medium of claim 18, further comprising instructions in which the BEBs perform operations comprising:
determining, by the first BEB, that there are no other PIM receivers having receiver interest for the multicast stream; and
stopping, by the first BEB, the multicast stream between the first BEB and the second BEB.

20. The non-transitory computer readable storage medium of claim 16, further comprising instructions in which the BEBs perform operations comprising:
deleting multicast data at the second BEB.

* * * * *